United States Patent
Harada et al.

[11] 3,905,834
[45] Sept. 16, 1975

[54] DRY CELL

[75] Inventors: Masahiro Harada, Fujisawa; Matsuyuki Takeda, Isehara; Mamoru Ichida, Fujisawa; Shohei Nozaki, Fujisawa; Kenji Miyahara, Fujisawa, all of Japan

[73] Assignee: Matsushita Electric Industrial Co., Ltd., Kadoma, Japan

[22] Filed: Apr. 18, 1972

[21] Appl. No.: 245,058

Related U.S. Application Data

[62] Division of Ser. No. 847,336, Aug. 4, 1969, abandoned.

[30] Foreign Application Priority Data

| Aug. 8, 1968 | Japan | 43-56911 |
| Sept. 16, 1968 | Japan | 43-67432 |
| Sept. 26, 1968 | Japan | 43-70511 |
| Oct. 31, 1968 | Japan | 43-80221 |

[52] U.S. Cl. ............... 136/107; 136/148
[51] Int. Cl. .............. H01m 21/00; H01m 3/00
[58] Field of Search ............ 136/131–132, 136/146, 145, 143, 147, 148, 167, 107, 102; 162/175, 178

[56] References Cited

UNITED STATES PATENTS

| 1,640,488 | 8/1972 | Deibel et al. | 136/131 |
| 1,670,604 | 5/1928 | Yngve et al. | 136/131 |
| 2,034,817 | 3/1936 | Johnson | 136/131 |
| 2,942,057 | 6/1960 | Huber et al. | 136/145 |
| 3,255,049 | 6/1966 | Wolfe | 136/107 |
| 3,513,033 | 5/1970 | Watanabe et al. | 136/107 |

*Primary Examiner*—Anthony Skapars
*Attorney, Agent, or Firm*—Stevens, Davis, Miller & Mosher

[57] ABSTRACT

A dry cell comprises a positive electrode mix containing manganese dioxide as a depolarizer, a negative zinc electrode and a separator layer consisting of powders of electrolyte-gelling agent and fibers. The separator layer is in a paper form wherein the powders and the fibers are integrally mixed together. The separator layer is interposed between the positive electrode mix and the negative zinc electrode. The present dry cell has less internal resistance and is excellent in discharge capacity, preservable life and electrolyte leakage resistibility, as compared with dry cell using a conventional separator layer.

7 Claims, 10 Drawing Figures

3,905,834

DRY CELL

This is a division of application Ser. No. 847,336, filed Aug. 4, 1969, now abandoned.

This invention relates to a dry cell, and more particularly a paper-lined dry cell, directed to improvements in the discharge capacity, preservable life and electrolyte leakage proofing by improving the separator paper.

A dry cell consists of a positive electrode mix, a separator layer containing an electrolyte liquid and a negative zinc electrode. In the Leclanche dry cell, natural manganese dioxide has been so far used as a positive electrode depolarizer, but the natural manganese dioxide has a low available oxygen content for the discharge of the dry cell and hence has a low discharge capacity, and so electrolytic manganese dioxide which has a high available oxygen content has been come into use recently. On the other hand, for a separator layer the so-called paste separator layer consisting of gelled starch impregnated with an electrolyte liquid has been generally used. That is, the Leclanche dry cell, as is now called a high performance dry cell, consists of a positive electrode mix principally composed of electrolytic manganese dioxide, acetylene black, ammonium chloride, zinc chloride and water, a paste separator layer containing an electrolyte liquid comprised principally of ammonium chloride, zinc chloride and water, and an amalgamated negative zinc electrode outer container or can.

However, in accordance with recent developments of electronics, a demand for a higher performance dry cell has greatly increased, and improvement in the discharge capacity, preservable life and electrolyte leakage resistibility are much more in demand. Dry cells are required in various fields of industries and the number of kinds of the dry cell now amounts to several tens. Manganese dry cell consumption demands an intermittent discharge property of the dry cell.

It is obvious that the improvement in intermittent discharge capacity depends upon the amount of manganese dioxide contained in the positive electrode mix, and thus it is important to pack a positive electrode depolarizer as much as possible in the limited volume of a dry cell in view of the preservable life and electrolyte leakage resistibility of the dry cell. As a result, the paste separator layer is now being replace, in a structural sense, with a paperlined separator layer using a separator paper.

The separator paper is, as shown in FIGS. 5 and 6, consists of Japanese paper, filter paper, kraft paper or linter paper 16, one side or both sides of which are coated with a natural starch or synthetic paste 17 dispersed in an electrolyte liquid and dried, and the separator paper is interposed between a positive electrode mix and a negative zinc electrode can and used as a separator layer after the electrolyte liquid has been absorbed into the separator paper.

In such separator paper, only 1.5 to 2.0 parts by weight of natural starch or synthetic paste is coated on one part by weight of Japanese paper, filter paper, kraft paper or linter paper, and consequently the swelling of the separator paper after the absorber of the electrolyte liquid is not sufficient. Thus, the separator paper cannot be tightly joined to the positive electrode mix and the negative zinc electrode and the contact resistance therebetween is high. Further, the proportion of pulp material in the separator paper is large, and the water retainability of the pulp material is lower than that of the positive electrode mix. Consequently, water in the electrolyte liquid absorbed in the pulp material is transferred to the positive electrode mix side during the storage of the dry cell, and as a result the internal resistance of the separator layer is increased.

In the conventional paper-lined dry cell, such increased internal resistance shows unfavourable influences upon the discharge capacity, preservable life and electrolyte leakage resistibility of the dry cell, as explained above. In order to prevent such an increase in internal resistance, it is necessary to reduce the proportion of pulp material in the separator paper, and in order to improve the degree of swelling and water retainability, it is necessary to increase the proportion of electrolyte-gelling agent such as natural starch and synthetic paste in the separator paper. However, it has been difficult to have recourse to such measures in separator paper having that structure, owing to the strength required for the pulp material.

An object of the present invention is to improve the water retainability and the degree of swelling of a separator layer by improving a separator layer of said paperlined dry cell, and consequently lower the internal resistance of the dry cell and improve the discharge capacity, preservable life and electrolyte leakage resistibility of the dry cell, though the present invention can be applied to a layer-built cell.

The present invention is characterized by the use of a separator paper obtained by making a paper integrally from such fibers as kraft pulp, linter pulp or polyvinyl alcohol fibers and such powders of electrolyte-gelling agent as starchs, gums, for example, gum Karaya, or cellulose derivatives. That is, the present invention is characterized by the use of a separator paper containing powders of electrolyte-gelling agent obtained by making a paper from fibers such as kraft pulp integrally together with the powders of such electrolyte-gelling agent. In the thus obtained separator paper, the powders of the electrolyte-gelling agent are uniformly dispersed and a large amount of powders of an electrolyte-gelling agent can be incorporated into the separator paper. Thus, the degree of swelling, when the separator paper absorbs the electrolyte liquid, becomes much higher, and as a result, the separator paper can be more closely adhered to the negative zinc electrode and the positive electrode mix. Furthermore, the speed and the retainability of water are increased, and thus the water retained in the separator paper is never transferred to the positive electrode mix side.

Another object of the present invention is to increase the mechanical strength of a separator paper by making it from a liquid dispersion containing the powders of the electrolyte-gelling agent and fibers dispersed therein, to which a sizing agent has been added, and to improve the efficiency in setting up dry cells, and to prevent the production of defective cells possessing an internal short circuit.

Another object of the present invention is to increase the strength of a separator paper by using an integrated paper obtained by integrating a paper made from powders of an electrolyte-gelling agent and fibers with a water-soluble film, kraft paper or linter paper and to prevent the decomposition of starchs contained in the paper made from powders of electrolyte-gelling agent and fibers by manganese dioxide contained in the positive electrode mix.

A further object object of the present invention is to increase the strength of a separator paper by using partially acetilated polyvinyl alcohol fibers as the fibers used to obtain a paper from the powders of electrolyte-gelling agent and the fibers.

Still further object of the present invention is to further improve the function of the insulating layer by using a paper made to have at least two layers comprising different mixing proportions of the powders of electrolyte-gelling agent to the fibers at the same time and interposing the thus prepared insulator paper between the positive electrode mix and the negative zinc electrode so that the layer having a larger proportion of electrolyte-gelling agent powders and good water retainability and degree of swelling may face the negative zinc electrode side, while the layer having a smaller proportion of electrolyte-gelling agent powders with a greater mechanical strength may face the positive electrode mix side.

The present invention is explained hereunder in detail, referring to the accompanying drawings.

Figure 2:
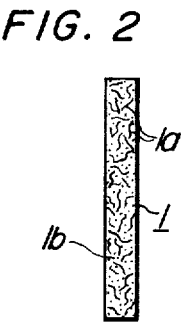
FIG. 2 shows a schematic view of a separator paper used in the dry cell of FIG. 1.

The separator paper of the present invention is integrally made from fibers 1a and powders of electrolyte-gelling agent 1b, as shown in FIG. 2, and is characterized in that both the fibers and the powders are uniformly dispersed throughout the entire separator paper.

A preferable method for preparing a separator paper integrally made from the powders of electrolyte-gelling agent and the fibers is explained hereunder:

Powders of electrolyte-gelling agent, for example, such as natural starchs as cornstarch, wheat flour starch, etc. or modified starchs or such gums as gum Karaya, or a cellulose derivative, as a main ingredient are admixed with such fibrous materials as kraft pulp, linter pulp or polyvinyl alcohol fibers as an adsorbing medium, and then the admixture is further mixed and dispersed in a coating media. Then, a polymeric setting agent, for example, an aqueous solution of sodium methacrylate or polyimine is added to the solution, and a paper is made from the solution while making the powders of electrolyte-gelling agent adsorb on said fibrous materials. In that case, it is preferable that 30 to 2 parts by weight of the fibrous materials are added to 70 to 98 parts by weight of the powders of electrolyte-gelling agent. The paper can, however, be made in any desired proportion suitable for the specific requirements of dry cell. Accordingly, any separator paper having a desired water-absorbing ability, water retainability and degree of swelling can be prepared.

The thus obtained separator paper has the above-mentioned excellent features, but still has some drawbacks. That is, the mechanical strength of the thus prepared paper is not so high, because the proportion of the fibers is less than that of the powders of electrolyte-gelling agent in the paper. Thus, there is such a fear that the separator paper might become ruptured when a dry cell is set up, and the working efficiency is thereby lowered, or the separator paper may be damaged after the dry cell has been set up and an internal short circuit thereby brought about.

One method for overcoming such a drawback is to make a paper after a sizing agent, for example, a vinyl acetate emulsion, has been added to a dispersing medium, for example, water, for dispersing the powders of electrolyte-gelling agent within the adsorbing medium fibers. According to this method, the powders of electrolyte-gelling agent are firmly fixed to the adsorbing medium by means of the sizing agent and are never liberated from the adsorbing medium, and a paper-like material, in which the adsorbing media are firmly intertwined with one another, can be obtained.

Another method is to use partially acetilated polyvinyl alcohol fibers as the fibers for adsorbing the powders of an electrolyte-gelling agent. The polyvinyl alcohol itself is soluble in water at room temperature and thus cannot adsorb the powders of electrolyte-gelling agent, but partially acetilated polyvinyl alcohol is insoluble in water at room temperature and only soluble at 60° to 80°C. Thus, the partially acetilated polyvinyl alcohol is effective at room temperature in adsorbing the powders of an electrolyte-gelling agent, and by melting the partially acetilated polyvinyl alcohol by heating the thus prepared paper to 60° to 80°C. when dried, the electrical resistance of the fibers themselves can be reduced and the strength of the separator paper can be increased simultaneously.

A more effective method for increasing the mechanical strength of the separator paper is to integrate the thus prepared separator paper with a kraft paper or linter paper, or a water-soluble film such as a polyvinyl alcohol film. According to this method, the strength of the separator paper made from the powders of an electrolyte-gelling agent and the fibers can be reinforced by the kraft paper, and by disposing the kraft paper side toward the positive electrode mix side, the oxidative decomposition of the powders of an electrolyte-gelling agent, particularly starches, by manganese dioxide in the positive electrode mix can be prevented.

Figure 3:
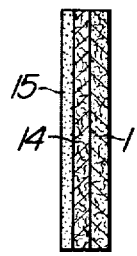
FIGS. 3 and 4 show schematic views of another embodiments of the present separator papers.

Further, according to the present invention, the separator paper 1 made from the powders of an electrolyte-gelling agent and the fibers, can be integrated with conventional paper 14 prepared by coating one side or both sides of a kraft paper or the like with an electrolyte-gelling agent 15 dispersed in an electrolyte liquid and drying the coated paper, as shown in FIG. 3, and can be used. In that case, the separator paper 14 having an electrolyte-gelling agent coating is disposed to face the negative zinc electrode side. When the kraft paper having an electrolyte-gelling agent coating on both sides is used as the separator paper 14, the water retainability is improved, and thus the formation of a complex salt during a course of storage, for example, of zinc diamine chloride, can be controlled, and the shelf life of the dry cell can be considerably improved.

Figure 4:
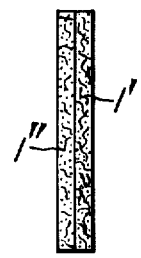
Figure 5:
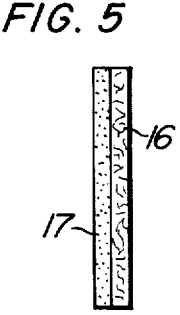
FIGS. 5 and 6 show schematic views of the conventional separator papers.
Figure 6:
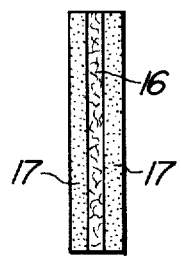

Still further, a separator paper consisting of at least two layers, each having a different mixing ratio of electrolyte-gelling agent powders to the fibers, can be used according to the present invention. In FIG. 4, the first layer 1' has a proportion of the powder to the fibers in the ratio of 70:30, while the second layer 1" has a proportion of 98:2. These two layers are integrated by making them into a paper at the same time, and the thus prepared separator paper is used so that the second layer side 1" will face the zinc negative electrode side.

A method for preparing a dry cell using the present separator paper is explained in detail below:

First of all, a positive electrode mix containing manganese dioxide, acetylene black, ammonium chloride, zinc chloride and water as principal ingredients is properly kneaded, and a bobbin of a positive electrode mix 3 shaped by tamping the mix around a positive carbon electrode rod 2 is enclosed with a separator paper 1 and inserted into a zinc negative electrode can 5 provided with a bottom paper washer 4 and an electrolyte liquid containing ammonium chloride, zinc chloride and water in advance, whereby a dry cell is prepared.

According to another method, a positive electrode mix containing manganese dioxide, acetylene black, ammonium chloride, zinc chloride and water as the main ingredients is properly kneaded, enclosed with a separator paper, and then inserted into a zinc can provided with a bottom paper washer. Then, a positive carbon electrode rod is inserted into the center of the positive electrode mix, whereby a dry cell is prepared. In this case, the electrolyte liquid in the positive electrode mix is transferred to the separator paper when the positive carbon electrode rod is inserted into the positive electrode mix, and the electrolyte-gelling agent powder in the separator paper are thereby gelled and a separator layer is thereby formed. As the present separator paper is excellent in its rate of water absorption and the degree of swelling due to the absorption of liquid, it is an ideal separator paper applicable to such a method for preparing a dry cell.

Figure 1:
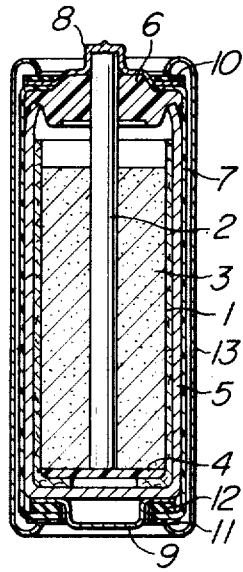
FIG. 1 shows a cross-sectional view of an AA type dry cell of the present invention.

In FIG. 1 an AA type dry cell is shown, wherein numeral 6 is a closure seal formed by synthetic resin such as polyethylene or polypropylene for sealing the opening of the zinc can, 7 is a heat-shrinkable resin tube of polyvinyl chloride or polyethylene, 8 is a metal top serving as a positive electrode terminal, 9 is a bottom plate serving as a negative electrode terminal, 10 and 11 are insulation rings, 12 is a bottom ring, and 13 is an exterior decorative cover.

The present invention is explained hereunder with reference to the Example.

EXAMPLE

100 Parts by weight of natural starch and 5 to 30 parts by weight of kraft pulp are mixed and dispersed in water, and 0.1 to 0.005 part by weight of a 1% aqueous solution of sodium methacrylate is added as an adsorbent medium to the aqueous dispersion and further 0.01 to 0.5 part by weight of a non-ionic surface active agent is added thereto on the basis of one part by weight of water of the aqueous dispersion. A paper is made from this said aqueous dispersion by means of a combined cylinder and Fourdrinier type paper machine. After suction and draining, the paper is compressed under a pressure of 10 to 30 kg/cm² and then dried at a temperature at which the powders of the electrolyte-gelling agent undergo no gellation, that is, below about 70°C., whereby a separator paper (a) is prepared.

For comparison, a starch dispersed in an electrolyte liquid containing ammonium chloride, zinc chloride and water as principal ingredients is coated onto one side of a sheet of kraft paper, and the thus coated kraft paper is dried, whereby the conventional separator paper (b) is prepared.

Figure 7:
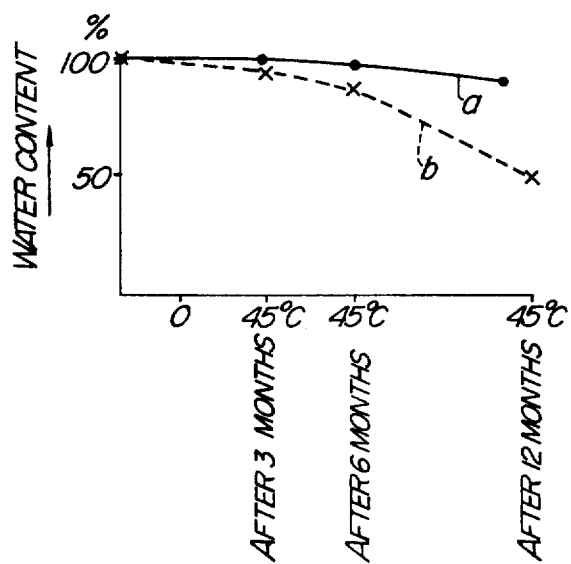
FIG. 7 is a diagram showing changes with time in the water retainability of the separator paper when the dry cells are stored.

In FIG. 7, changes in water retainability of said separator papers a and b when the dry cells as shown in FIG. 1 are set up from these separator papers respectively and stored at 45°C. are shown.

Figure 8:
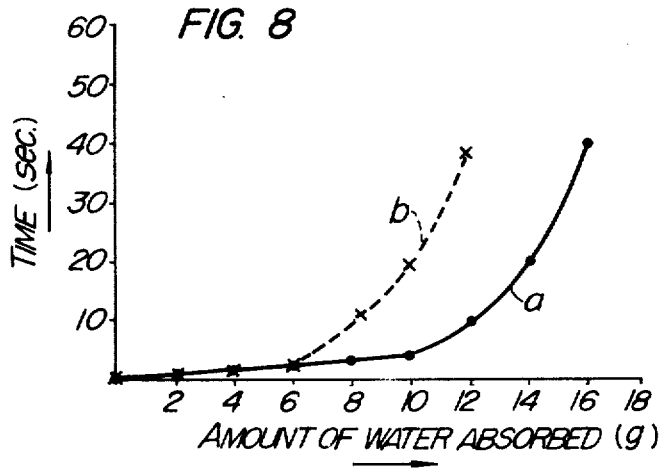
FIG. 8 is a diagram showing the amount of water absorbed by the separator paper.

In FIG. 8, changes in the amounts of water absorbed when 10 g of the separator papers a and b absorb the electrolyte liquid are shown.

Figure 9:
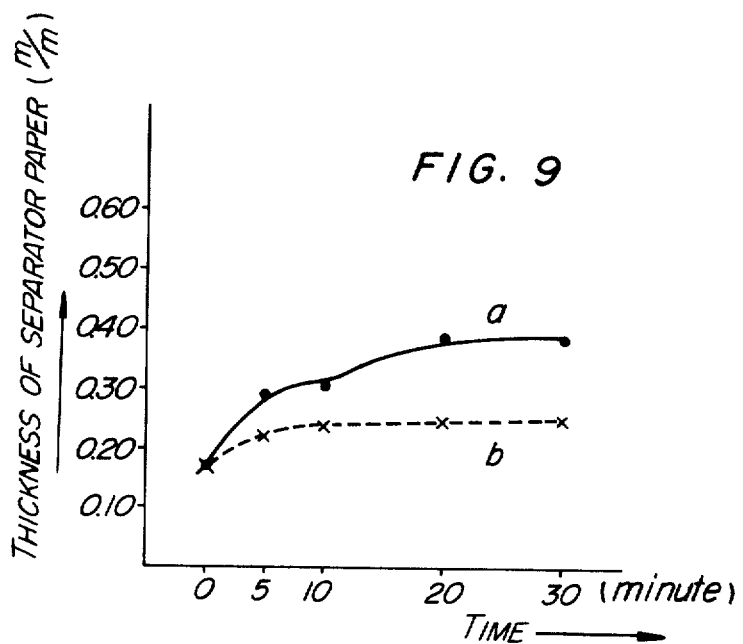
FIG. 9 is a diagram showing changes in the degree of swelling of the separator paper.

In FIG. 9, changes with time in the degree of swelling of the separator papers a and b when the separator papers are immersed in the electrolyte liquid are shown.

When the AA cell-type dry cells A and B as shown in FIG. 1 are set up using said separator papers a and b respectively, the discharge properties and the rate of electrolyte leakage of these dry cells are determined, and the results are shown in Tables 1 to 3.

Table 1

| | Discharge duration time down to 0.85V in the case of intermittent discharge using a 10Ω load (30 minutes/day) | |
|---|---|---|
| Dry cell | Immediately after preparation | After 6 month storage at 45°C. |
| A | 430 minutes | 400 minutes |
| B | 380 minutes | 330 minutes |

Table 2

| | Number of voltage-defect dry cells amongst a batch of 100 dry cells that were stored at 45°C. | |
|---|---|---|
| Dry cell | After 6 month storage at 45°C. | After 12 month storage at 45°C. |
| A | 0 | 1 |
| B | 2 | 5 |

Table 3

| | Number of leaked dry cells in the case where 50 dry cells are discharged for 24 hours at 20°C. with an external load of 10Ω and then left for standing at 30°C. for the period indicated. | |
|---|---|---|
| Dry cell | After standing 30 day | After standing 60 day |
| A | 0 | 8 |
| B | 10 | 32 |

Figure 10:
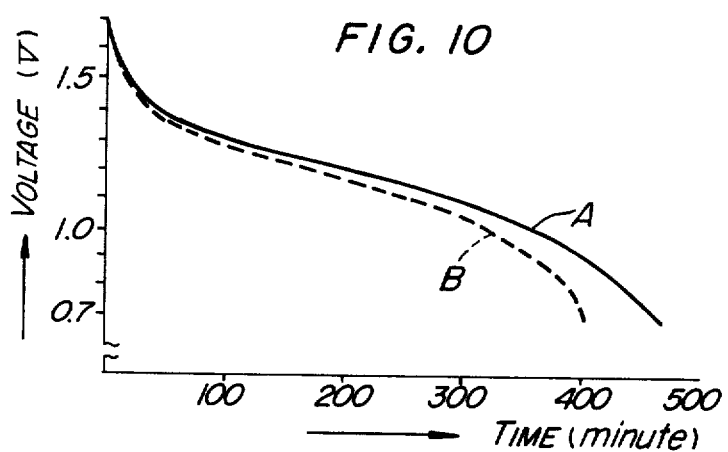
FIG. 10 is a diagram showing the intermittent discharge capacity of the dry cell.

The discharge curves of the dry cells A and B that had been subjected to intermittent discharge (30 minutes 1 day with 10 Ω load) are shown in FIG. 10.

It is evident from the foregoing results that the present separator paper has a high rate of water absorption and is excellent in water retainability and degree of swelling, and that the dry cell using the present separator paper has less internal resistance, a greater discharge capacity, less deterioration in performance even after storage and good electrolyte leakage resistibility.

What is claimed is:

1. A dry cell comprising a positive electrode mix containing manganese dioxide as a depolarizer, a negative zinc electrode, and a separator containing liquid electrolyte and interposed between the said electrode mix and zinc electrode, said separator being a sheet comprising paper fibers and particles of electrolytic-gelling agent substantially uniformly distributed throughout the sheet and prepared by dispersing electrolytic-gelling agent particles and paper forming fibers, mixing the resulting dispersion until a substantially uniform mixture of particles and fibers is obtained, forming a sheet therefrom, and drying the sheet at a temperature at which the electrolytic-gelling agent is not gelled, whereby the particles of electrolytic-gelling agent in said separator are gelled by the said electrolyte liquid.

2. The dry cell of claim 1 wherein the electrolytic-gelling agent is natural starch, modified starch, a gum or cellulose derivative.

3. The dry cell of claim 1 wherein the fibers are kraft pulp, linter pulp or partially acetylated polyvinyl alcohol fibers.

4. The dry cell of claim 1 wherein the separator comprises a plurality of sheets each containing a mixture of said particles and fibers different from that of the others.

5. The dry cell of claim 1 wherein the face of the separator which faces the zinc electrode is coated with an electrolytic-gelling agent.

6. The dry cell of claim 1 wherein the fibers comprise acetylated polyvinyl alcohol fibers which are substantially insoluble in water at temperatures below 60°C.

7. The dry cell of claim 1 wherein the separator comprises a plurality of layers containing different amounts of fibers.

* * * * *